T. PERNEK, Sr.
AUTOMATIC EXTINGUISHER.
APPLICATION FILED AUG. 22, 1914.

1,269,501.

Patented June 11, 1918.
8 SHEETS—SHEET 1.

T. PERNEK, Sr.
AUTOMATIC EXTINGUISHER.
APPLICATION FILED AUG. 22, 1914.
1,269,501.
Patented June 11, 1918.
8 SHEETS—SHEET 2.
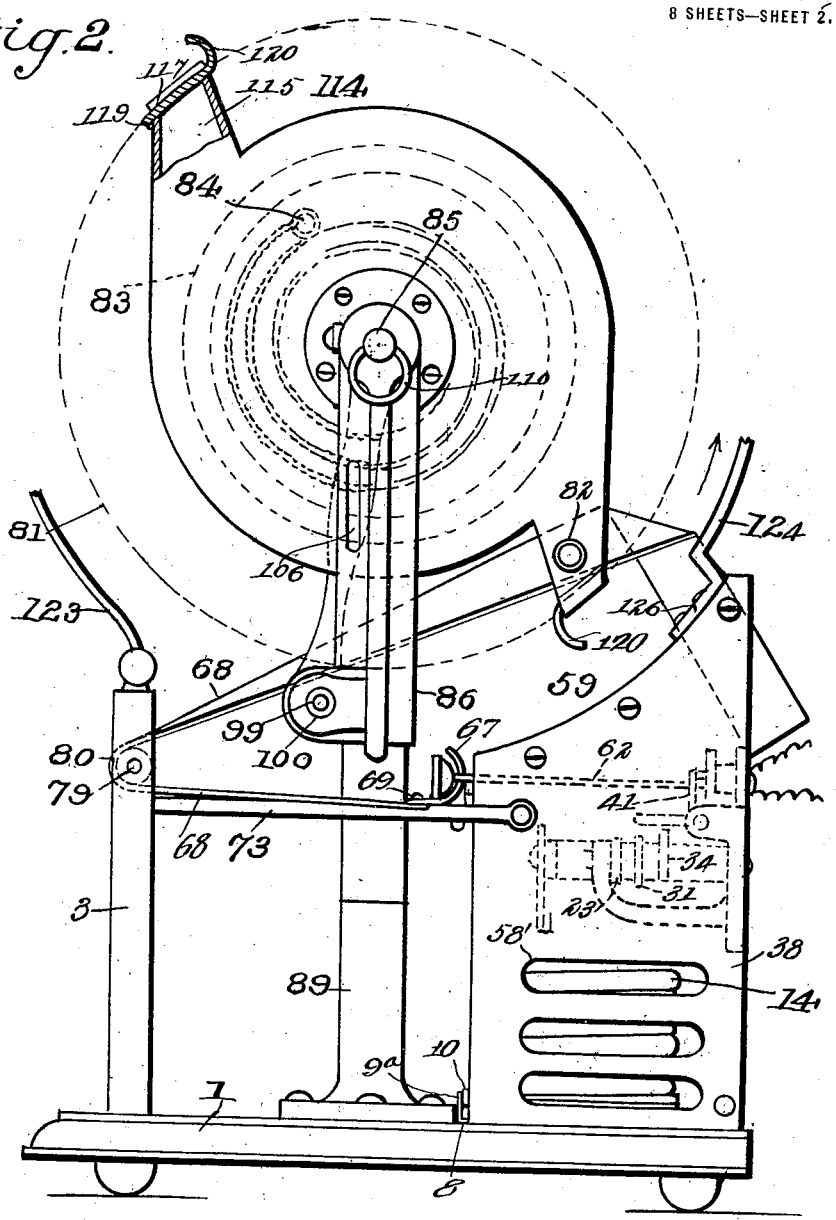
Fig. 2.
Witnesses
J. A. Ryan.
Wm. S. Fowler.
Inventor
Thomas Pernek, Sr.
By
Attorney

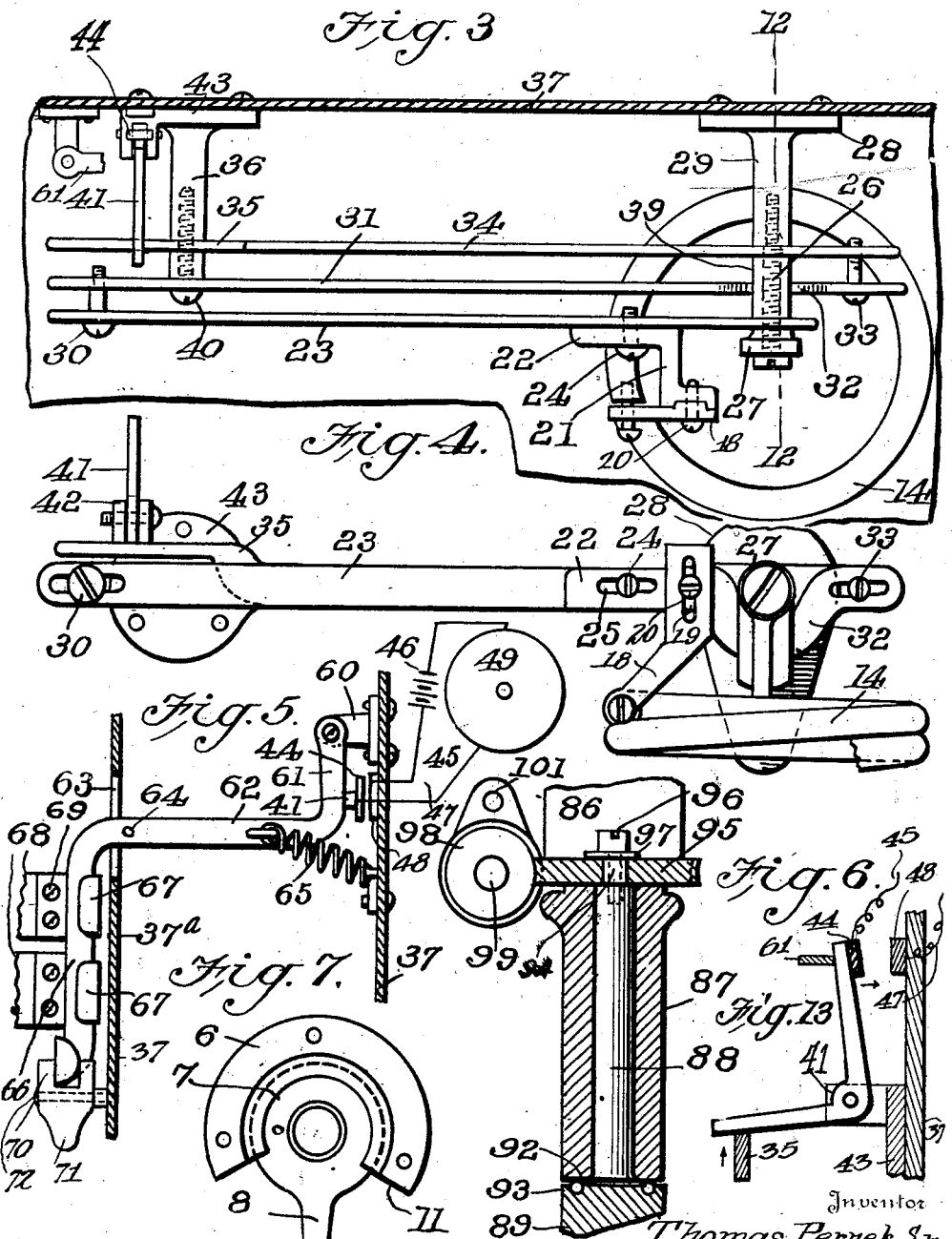

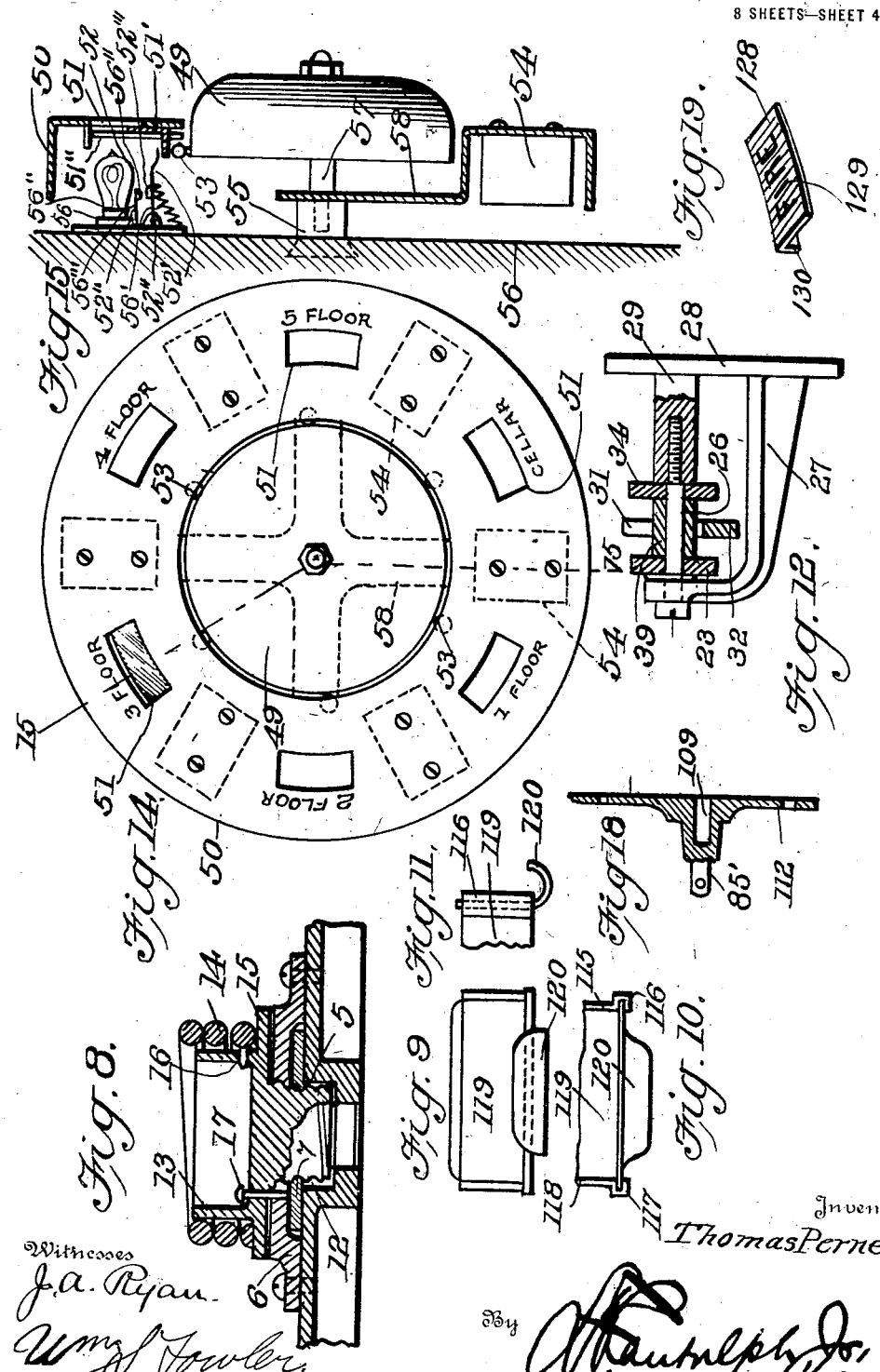

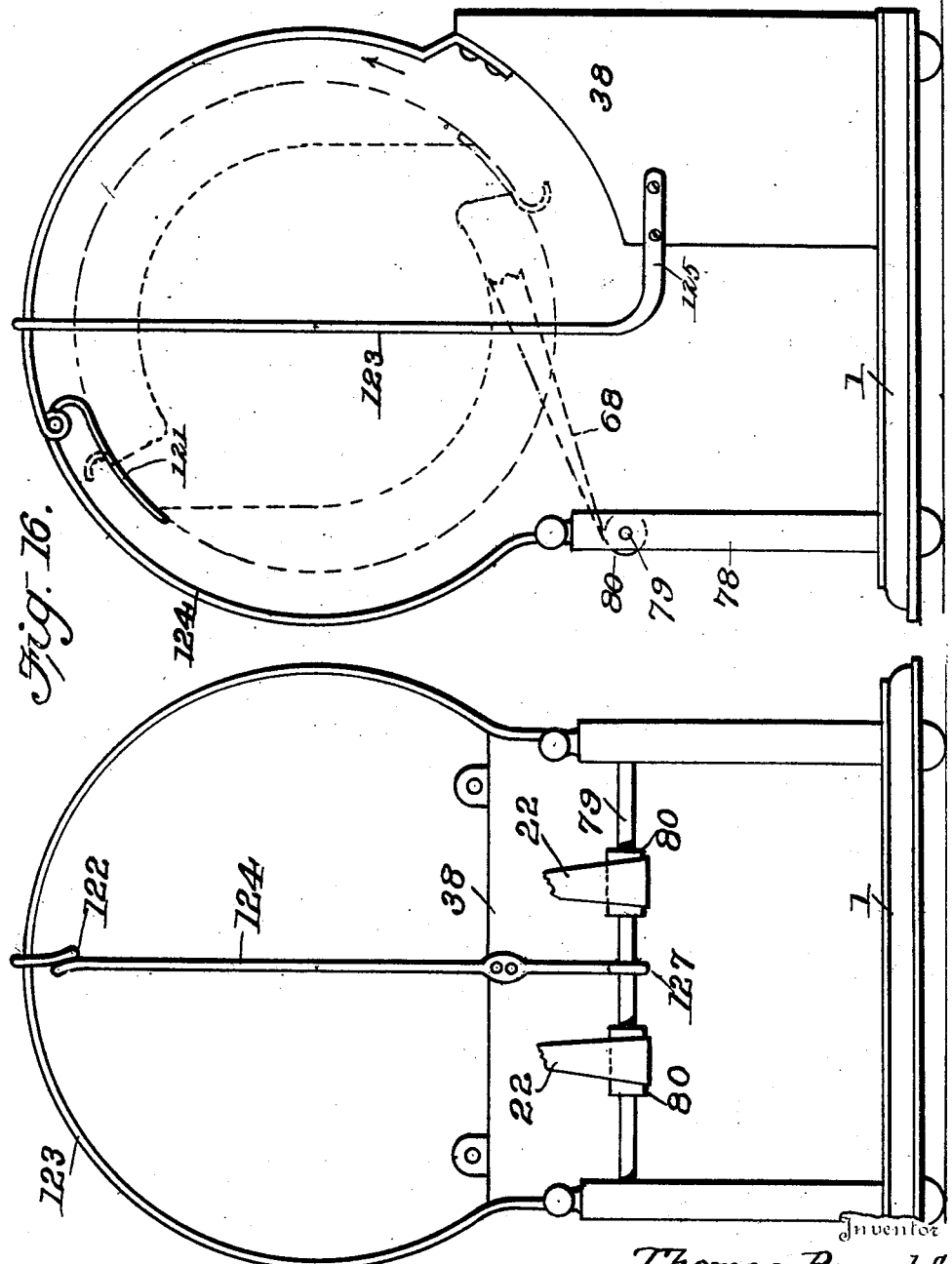

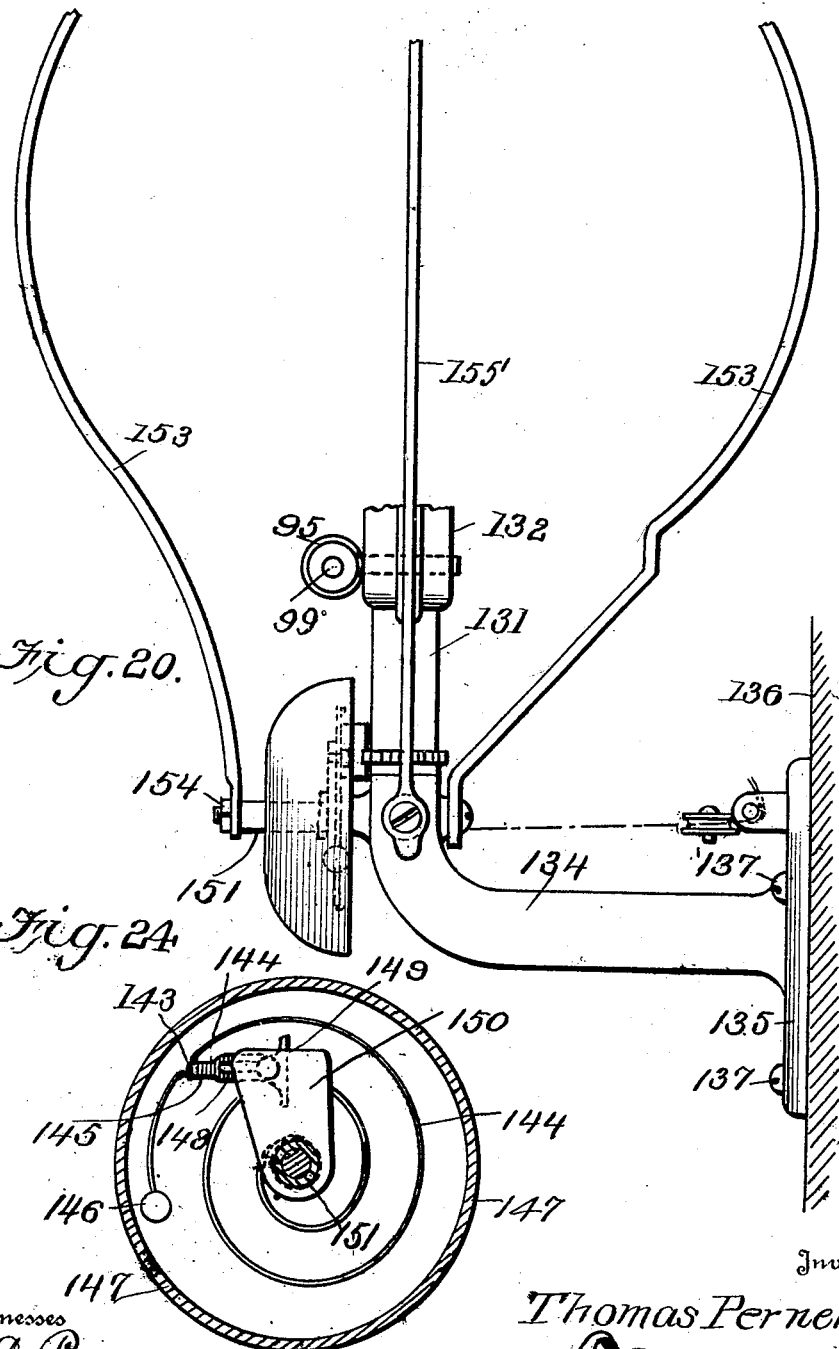

T. PERNEK, Sr.
AUTOMATIC EXTINGUISHER.
APPLICATION FILED AUG. 22, 1914.
1,269,501.
Patented June 11, 1918
8 SHEETS—SHEET 7.
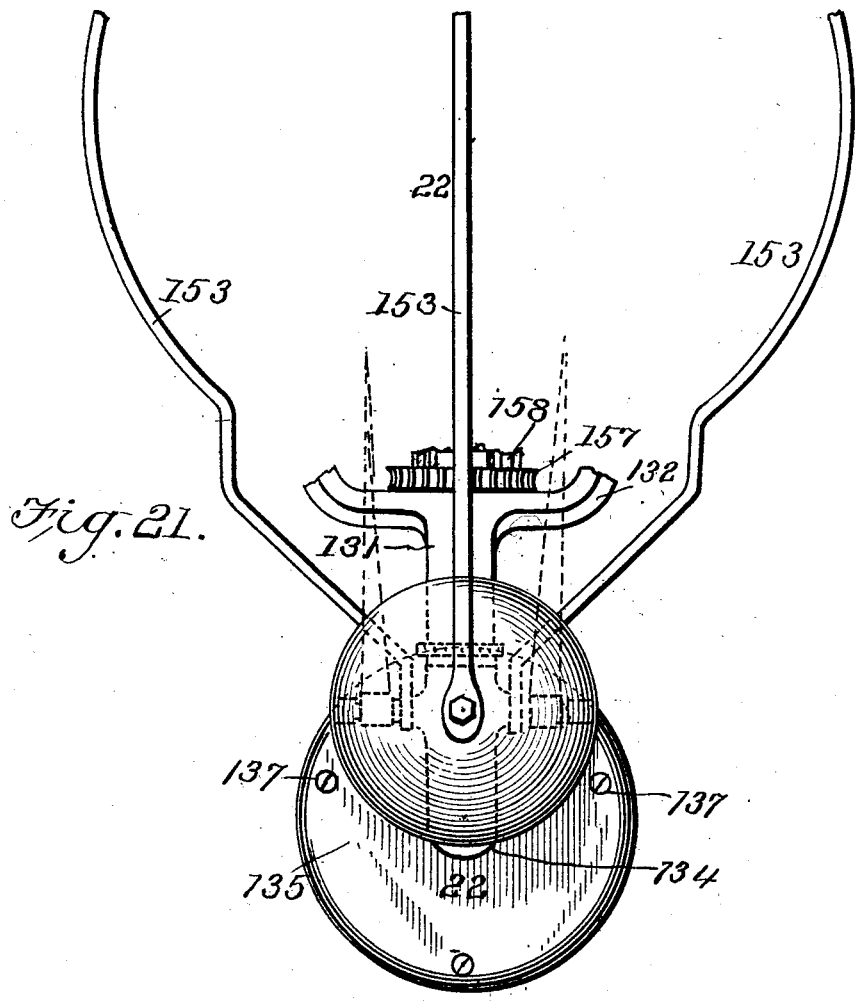
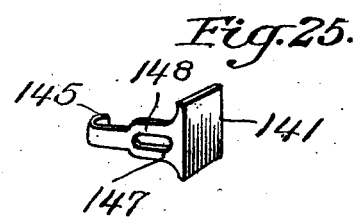

T. PERNEK, Sr.
AUTOMATIC EXTINGUISHER.
APPLICATION FILED AUG. 22, 1914.
1,269,501.
Patented June 11, 1918.
8 SHEETS—SHEET 8.
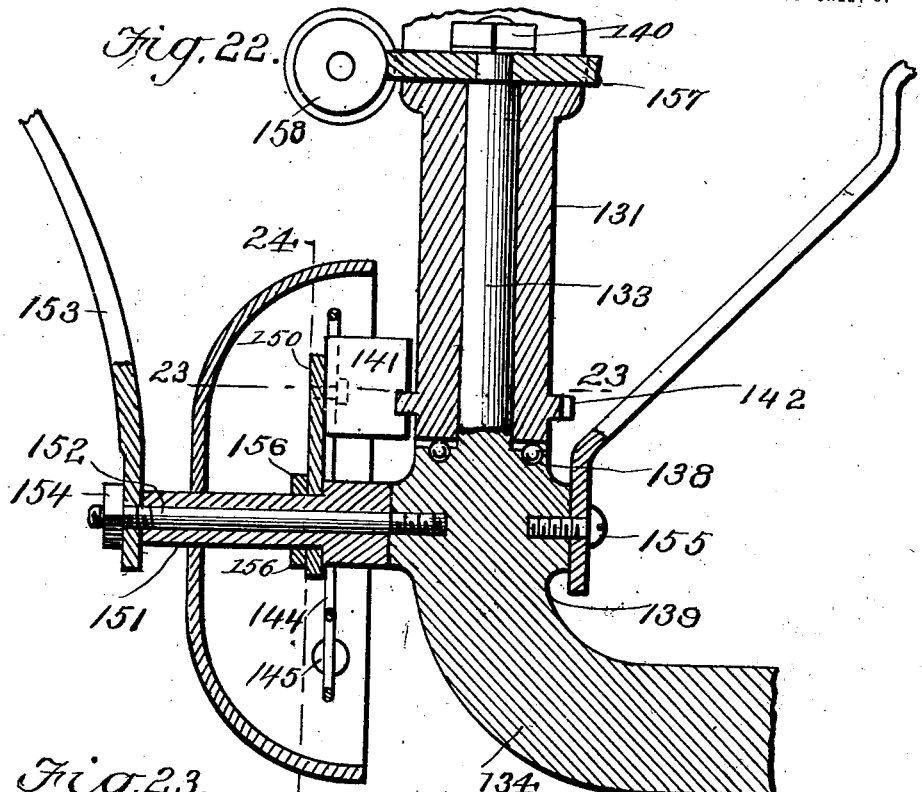
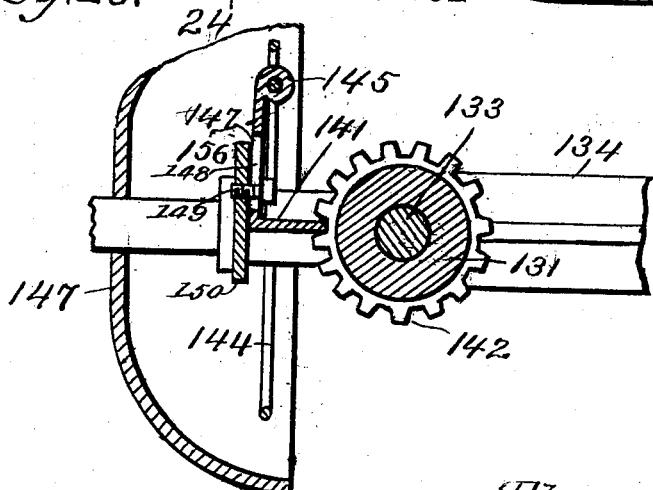
Witnesses
J. A. Ryan
Wm. S. Fowler
Inventor
Thomas Pernek, Sr.
By
Attorney

UNITED STATES PATENT OFFICE.

THOMAS PERNEK, SR., OF HARTFORD, CONNECTICUT.

AUTOMATIC EXTINGUISHER.

1,269,501.  Specification of Letters Patent.  Patented June 11, 1918.

Application filed August 22, 1914. Serial No. 858,104.

*To all whom it may concern:*

Be it known that I, THOMAS PERNEK, Sr., a citizen of the United States, residing at Hartford, in the county of Hartford and State of Connecticut, have invented certain new and useful Improvements in Automatic Extinguishers; and I do hereby declare the following to be a full, clear, and exact description of the invention, such as will enable others skilled in the art to which it appertains to make and use the same.

This invention comprehends certain new and useful improvements in automatic extinguishers and has for its primary object to provide a device of this character which will be of such construction as to sound an alarm in case of a fire and automatically apply a fire extinguishing substance to the blaze when the same approaches the device.

Another object of the invention is to provide a device of this character which will be of such construction that the first alarm will be sounded when the temperature of the surrounding atmosphere increases above a predetermined degree as in case of a fire.

The invention has for a further object to provide a device of this character including a drum which will be automatically opened and rotated when released by the destruction of frail film strips, the drum being mounted in such manner that the rotation of the same will cause a rotary movement of the bearing within which the drum is mounted, thereby making it possible for the drum to equally distribute its contents upon all sides to extinguish the blaze by which the frail member is destroyed.

The invention has for a further object to provide an improved and novel form of means for mounting and operating the drum as well as opening the same automatically upon the destruction of the frail member or fuse which also controls the circuit closing member and allows operation of the same upon destruction of said frail member or fuse to sound a second alarm.

The invention has for a further object to generally improve and simplify the construction and operation of devices of this character and increase the efficiency thereof without materially increasing the cost of the same.

With these and other objects in view as will become more apparent as the description proceeds, the invention consists in certain novel feature of construction, combination and arrangement of parts as will be hereinafter more fully described and claimed.

For a complete understanding of my invention, reference is to be had to the following description and accompanying drawings, in which—

Fig. 2 is a side elevation thereof,

Figure 1:
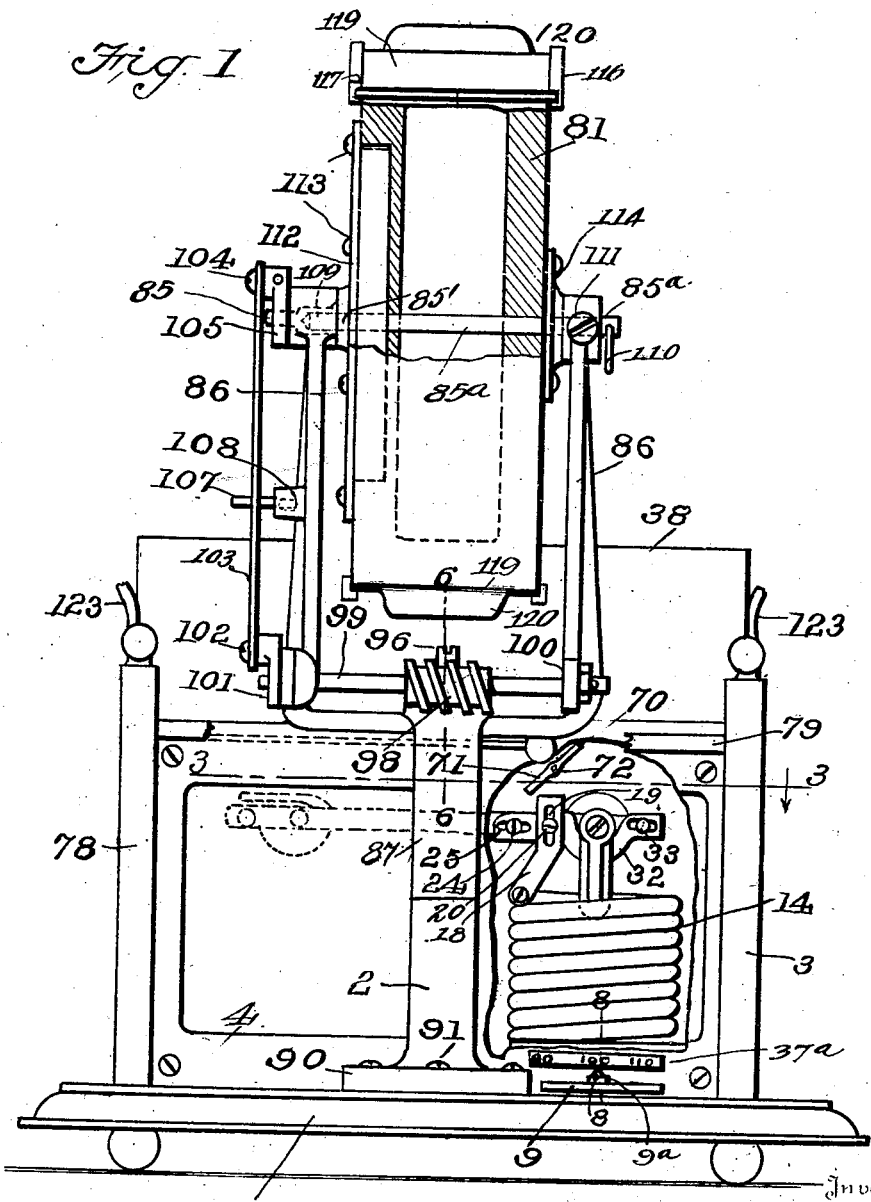
Figure 1 is a front elevation of the complete device.

Fig. 3 is a detail transverse sectional view on the horizontal plane of line 3—3 of Fig. 1, Fig. 4 is an enlarged front elevation of the parts shown in Fig. 3, Fig. 5 is a detail plan of the spring actuated circuit closing mechanism, Fig. 6 is a fragmentary detail vertical section on the plane of line 6—6 of Fig. 1, Fig. 7 is a plan view of the indicator and adjustable member in which it is mounted, Fig. 8 is a detail fragmentary vertical section on the plane of line 8—8 of Fig. 1, Figs. 9, 10 and 11 are fragmentary detail views showing the manner in which the drum doors are secured in position, Fig. 12 is a detail transverse section on the plane of line 12—12 of Fig. 3, Fig. 13 is a detail view of the right angled pivoted circuit closing member, Fig. 14 is a front elevation of the dial employed in my invention, Fig. 15, is a transverse section through said dial and the parts beneath the same, on the plane of line 15—15 of Fig. 14, Fig. 16 is a side elevation, looking at the side opposite that shown in Fig. 2, to illustrate the protecting door opening wires, the drum being shown by dotted lines and parts of the device being omitted in this view, Fig. 17 is an elevation at right angles to Fig. 16, Fig. 18 is a fragmentary detail sectional view, showing the mounting for one end of the axle of the drum, Fig. 19 is a detail perspective view of a second form of slidable door employed on the dial, Fig. 20 is a side elevation of a modified form of the device with parts broken away, Fig. 21 is a view similar to Fig. 20 and at right angles to the same, Fig. 22 is a slightly enlarged detail vertical section on the plane of line 22—22 of Fig. 21, Fig. 23 is a detail horizontal section on the plane of line 23—23 of Fig. 22, Fig. 24 is a detail vertical section on the plane of line 24—24 of Fig. 22, and Fig. 25 is a detail perspective view of the drum operated member.

Referring to the drawings by numerals, 1 designates the base upon which is mounted the hollow central standard 2 and the corner standards 3, which latter are connected by a suitable frame 4.

The base 1 is provided with a socket 5 over which is securely fastened the plate 6 having its main portion spaced above the upper flat face of the base surrounding the socket 5 and provided with a central opening registering with the central opening in said socket 5, the purpose of which will presently appear.

Positioned upon the upper face of the socket 5 and beneath the main portion of the plate 6 is the indicator carrying disk 7 which has a tongue 8 projecting from the periphery thereof. This tongue extends through a slot 9 in the wall 37$^a$ of the thermostatic casing 38, and is provided at its outer end with an index finger 9$^a$ adapted to coöperate with an indicating strip 10 secured to the wall 37$^a$ to indicate the temperature at which the fire alarm may be expected to sound. It will be understood that the tongue 8 projects through the slot 11 formed in the periphery of the plate 6 by cutting away a portion of the same.

Threaded in the central opening of the indicator carrying disk 7 is the depending stem 12 of the thermostat carrying cup 13 which has the lower end of the thermostat proper 14 engaged therearound and securely fastened to the outer face of the same and upon the lower outwardly directed annular flange 15 of said cup 13, as shown at 16. The cup 13 is prevented from rotating after the parts have been properly adjusted by a screw 17 or the like which extends through the bottom thereof and has threaded engagement in the main portion of the plate 6.

It will be understood that the thermostat proper 14 may be formed of any suitable material and is preferably coiled, as shown in the drawings, and has an upwardly directed arm 18 secured to its upper extremities and provided with an elongated vertical slot 19 through which the set screw 20 is engaged and threaded in the forwardly directed arm 21 of the casting 22 which is adjustably and securely mounted upon the horizontal bar 23, by a set screw 24 or the like engaged through the elongated horizontal slot 25 of said casting 22, thereby rigidly connecting the horizontal bar 23 with the thermostat proper 14 to be raised automatically upon expansion of said thermostat proper 14. The purpose of this will presently appear.

The end of the horizontal bar 23 adjacent which the casting 22 is secured rests upon the screw 26 which serves to connect the upturned free end of the arm 27 of the supporting bracket 28 with the short horizontally directed arm 29 of said supporting bracket 28. The opposite end of the horizontal bar 23 has a screw 30 or the like extended transversely through the same and secured in the corresponding spaced end of the second horizontal bar 31 which has its opposite end provided with a downwardly curved and offset portion 32 to avoid the screw 26 and clear the main portion of the long arm 27 of the supporting bracket 28. A screw or the like 33 is extended through the last mentiond end of the second horizontal bar 31 and threaded in the corresponding spaced end of a third horizontal bar 34 which rests upon the screw 26 and has its opposite end in the form of an upwardly offset horizontal finger 35 above the horizontal bracket arm 36 which is substantially parallel with the spaced horizontal arm 29 of the supporting bracket 28 and is secured to the inner face of the wall 37 of the thermostat casing 38. It will be understood that the screw 26 extends through the corresponding ends of the horizontal bars 23 and 34 supported by the same, while the offset portion 32 of the corresponding end of the horizontal bar 31 extends beneath said screw 26 and the arm section 39 mounted upon the same to complete the arm 29. It will also be understood that the opposite end of the second mentioned horizontal bar 31, resting upon the arm 36, has the screw 40 extended through the same and into the free end of said arm 36, whereby said second mentioned horizontal bar 31 will be pivotally mounted upon the supporting arm 36, while the first mentioned horizontal bar 23 and third horizontal bar 34 are pivotally mounted upon the horizontal arm 29 of the supporting bracket 28 to insure proper operation of the device to cause an upward movement of the finger 35 upon upward expansion of the thermostat proper 14, to engage said horizontal finger 35 with the circuit closing right angled member 41, it being understood that said member 41 is adjusted in the supporting ears 42 to place one arm of said right angled circuit closing member 41 to the proper distance above the finger 35 when the latter is in normal position. It will also be understood that the supporting ears 42 are preferably formed with the casting 43 from which the supporting arm 36 projects and which is secured to the wall 37 of the thermostat casing 38 in any suitable manner. It will further be understood that an upstanding arm or angle of the right angled circuit closing member 41 has a contact block 44 secured on one face with a current conducting wire 45 connected therewith and leading to one pole of a battery 46, while the current conducting wire 47 leading from the opposite pole of the battery 46 is connected with a contact block 48 secured against the wall 37 of the thermostat casing 38, whereby upon upward movement of the horizontal arm of the circuit closing member 41 by the finger 35 of the horizontal bar 34 to swing the circuit closing member 41 to operative position, the contact block 44 carried by said circuit closing member 41 will be forced into engagement with the contact block 48 to complete the circuit and thereby ring the bell 49 within said circuit.

The bell 49 is preferably positioned in the center of the dial 50 which may be located at any suitable point in the building within which my device is positioned, in order that the sounding of the bell will attract the attention of the janitor or other attendant.

It will be understood that the dial 50 is preferably provided in its portion surrounding the bell 49 with a plurality of openings 51 through which may be seen a light of any desired color upon operation of the device upon either floor of the building, the number of the floor being placed adjacent each opening 51, whereby it may be readily determined upon which floor the fire has started. Opposite each opening 51 I have shown a bulb 52 which may be connected with the circuit leading to the apparatus placed on the proper floor of the building, and I have also provided a separate hammer 53 and connected with the hammer operating mechanism 54 provided therefor, whereby the hammer 53 will be caused to play upon the gong 49 as the circuit through the hammer operating mechanism 54 is completed. The gong 49 and dial 50 are secured upon a suitable spacing member 55 positioned upon a wall or other suitable stationary support 56, by means of the supporting screw 57 which extends centrally through the gong and through the bracing arms 58 forming the center of the dial and connecting the opposite sides thereof.

As the hammer 53 operates it will engage the inwardly directed end of the door 51' engaged in suitable guides 51'' on the rear face of the dial 50 and to opposite sides of the opening 51, thereby forcing the door 51' outwardly with respect to the bell over the opening 51 in front of the bulb 52 which is opposite said opening 51. As the door 51' moves outwardly, the inwardly directed end thereof engages the free end of the resilient member 52' and swings the same upon its attached end 52'' against the tension of the spring 56' secured to the support 56 until the contact block 52''' carried by said pivoted member 52' engages the contact block 56'' mounted upon a support 56''' which is also carried by the support 56 and has electrical connection with the bulb 52 to complete a circuit through said bulb, as the door 51' moves into position in front of the same, it being understood that the door 51' is formed of any suitable transparent material.

It will be understood that the thermostat casing 38 has suitable openings 58' in one face opposite the thermostat proper 14 or expanding member of said thermostat, and said casing 38 is mounted upon the base 1, at one edge thereof and extends inwardly toward the center, the upper edge or top 59 of said casing being inclined downwardly toward the inner side of the casing, the purpose of which will presently appear.

In the thermostat casing 38 and secured to the rear wall 37 thereof adjacent the contact block 48 is a bracket 60, the free bifurcated end of which is pivoted to the inner right angled end 61 of the lever 62 which projects through the opening 63 in the inner wall 37ᵃ of the casing 38 and has a pin 64 engaged transversely therethrough to limit outward movement of said lever 62. A spring 65 has one end connected with the lever 62 and its opposite end connected with the rear or outer wall 37 of the casing 38 to draw the lever 62 inwardly and thereby swing the same in the bracket 60 in the proper direction to force the right angled inner end 61 of said lever 62 against the upstanding arm or angle of the circuit closing member 41 and thereby force said member 41 to operative position to engage the contact block 44 with the contact block 48 and thereby complete the circuit as previously described. The lever 62 has its outer end 66 extended at a right angle and secured in the lever holding member 67 secured upon the free ends of the film strips 68, as shown at 69, to retain the lever 62 in its outermost or inoperative position against the tension of the spring 65. When the lever 62 is released by the film 68 it is adapted to engage and actuate the member 41 and carry the contact block 44 into engagement with the contact block 48 and close the circuit and sound the alarm. By this arrangement the circuit may be closed either by the operation of the thermostat 14 or the film controlled lever 62.

Should it be desired to positively lock the lever 62 against operation, even upon destruction of the film strips 68, the locking yoke 70 is turned by means of a handle 71 upon its pivot pin 72 to operative position, when the free forward extremity of the lever 62 will be inclosed in said yoke and prevented from moving rearwardly toward the thermostat casing 38. The yoke may be pivotally mounted in any desired manner to enable it to swing into and out of engagement with the lever 62 for holding the same out of engagement with the member 41. It is specially desirable to lock the lever 62 against operation while cleaning the device.

Bracing rods 73 are connected with the opposite ends of the thermostat casing 38 and suitably secured to the front corner posts 3 which extend upwardly from the base or platform 1, and the opposite front corner posts 3 are connected adjacent their upper ends by a front transverse bar 79 which has rollers 80 mounted thereon at spaced distances, over which the film strips 68, previously mentioned, are engaged, said film strips being extended upon opposite sides of the drum 81 and secured to the opposite sides thereof by the screws 82 or other suitable securing members to prevent rotation of said drum 81 from action of the coil spring 83 positioned therein, said spring having one end secured to one side of the drum, as shown at 84, while its opposite end is secured to the axle 85 of the drum 81 which axle is rotatably directed in the upper ends of the bearing arms 86 which are brought together at their lower ends and terminate in the depending hollow sleeve 87 which is engaged around the reduced upper portion 88 of the central standard 89 which has an outwardly flanged lower end 90 which is secured by screws 91 or other suitable means to the upper face of the base 1. The lower end of the sleeve 87 rests upon bearing balls 92 positioned in a suitable channel 93 formed in the shoulder produced by reducing the upper end of the central standard 89, thereby reducing friction to the minimum as the sleeve 87 rotates on the reduced upper end 88 of said standard 89. The upper extremity of the upper portion 88 of the central standard 89 is still further reduced and of substantially rectangular form in cross section, said extremity being designated by the numeral 94 and having a worm gear 95 mounted thereon and secured against movement by a securing screw 96 or the like threaded in said extremity 94 and having a washer 97 engaged therearound and bearing upon the upper face of said worm gear 95 to prevent said gear from working off of the extremity 94. The purpose of the worm gear 95 will presently appear.

Engaged with the worm gear 95 is a worm wheel 98 which is rigidly mounted upon the shaft 99 which has its opposite ends rotatably mounted in the bearing gears 100 projecting laterally from one side of the supporting arms 86 adjacent the bottom thereof. Securely mounted upon one projecting end of the shaft 99 is a crank disk 101 with the eccentric pin 102 with which is connected one end of a pitman 103 which has its opposite end connected with the eccentric pin 104 by the cam disk 105 which is securely mounted upon the corresponding projecting end of the axle 85 whereby the shaft 99 and worm wheel 98 will be caused to rotate upon rotation of the drum 81, upon the axle 85, to cause the worm 98 to ride around the worm gear 95 and thereby cause the sleeve 87, arms 86, axle 85 and drum 81 to revolve upon the central standard 89 during rotation of the drum 81 upon said axle 85, thereby imparting a motion which will cause the drum 81 to thoroughly scatter its contents around the base 1 to extinguish the fire approaching the same. It will be understood that the pitman arm 103 is provided with a suitable elongated longitudinal slot 106 within which is engaged a guide pin 107 mounted in a suitable socket 108 projecting laterally from the adjacent arm 86 and serving to guide and limit movement of said pitman arm 103 and also assist in the operation of the same.

The end of the axle 85 upon which the crank disk 105 is mounted, is provided with a socket 109 in its inner face to receive one end of the axle 85$^a$, the opposite end of which projects through the opposite supporting and bearing arm 86 and has a winding ring 110 mounted therein, whereby said axle 85$^a$ may be rotated to wind the spring 83, after which the axle 85$^a$ may be secured against rotation in a reverse direction by the set screw 111 mounted in the last mentioned arm 86 and adapted when threaded inwardly to engage the axle 85$^a$. An axle support 85′ has a large annular flange 112 formed around its inner end and adapted to be secured by screws 113 or other suitable means to the adjacent face of the drum 81 and said axle support 85′ will be rotated in the arm 86, through which it is mounted upon rotation of the drum 81 to cause operation of the pitman arm 103 and parts connected therewith, as previously described.

It will be understood that the film strips 68 will serve to hold the spring 83 under compression and prevent rotation of the drum 81 to unwind the spring 83 until the film strips 68 have been consumed by the blaze, it being understood that the film strips are of such material that they will readily be set on fire, thereby making it certain that the device will be set in operation as soon as the blaze reaches the film strips 68.

The drum 81 is filled with any suitable fire extinguishing material and has a plate or member 114 on its face opposite that to which the flange 112 is secured. The drum is provided at its periphery at substantially diametrically opposite points with spouts or extensions 115 projecting from the periphery of the drum and terminating in guide ways 116 for the reception of sliding doors or covers 119 which are provided at one end with an outwardly curved lip 120. Upon destruction of the film strips 68 and rotation on turning of the drum 81, the lip 120 will automatically engage the inwardly directed loop 122 of one of the substantially circular protecting wires 123 and 124 respectively which extend over the drum 81 and cross one another at their central portions. The wire 123 has its opposite ends 125 bent at an angle and secured to opposite ends of the thermostat casing 38, while one end of the upper face or top of the thermostat casing 38 adjacent the upper edge thereof, as shown at 126, while the opposite end of said wire 124 is secured upon the transverse bar 79, as shown at 127.

It will be evident that as the drum 81 continues to rotate, the covers 119 will be automatically withdrawn, thereby providing opposite openings in the drum 81, from which the material within the same may escape during operation of the device. It will further be understood that as soon as the film strips 68 are destroyed, the lever 62 will operate to sound the said signal, and any number of bells or other signaling devices may be placed in the electric circuit closed upon engagement of the contact block 44 with the contact block 48 caused by operation of either the lever 62 or the circuit closing member 41.

In Fig. 19 I have shown a modified form of door 128 to be substituted for the door 51', the door 128 having a rear outer face with the word "Fire" positioned thereon, as indicated at 129 while one end 130 is extended inwardly at a right angle for engagement by the hammer, the same as in the preferred form. When the modified form of door 128 is employed, the contact member for completing a circuit through the bulb 52 may be dispensed with and the bulb not used, the red surface of the door with the word "Fire" thereon taking the place of the bulb.

In Figs. 20 to 25 inclusive I have shown a modified form of the device, in which I have provided a hollow rotatable support 131 having the outwardly directed arms 132 in which may be rotatably mounted a drum similar to the drum shown in the preferred form but not shown in the modified form.

It will be understood that the drum may be mounted in any suitable manner in the arms 132 and the hollow rotatable support 131 is rotatably mounted upon the upstanding stem 133 of the curved supporting bracket arm 134 which has a plate 135 formed on one end and adapted to be secured against a wall or other suitable stationary support 136 by screws 137 or other suitable means. It will be understood that the stem 133 is of smaller diameter than the supporting bracket arm 134 and in order to reduce friction to the minimum, I have provided a plurality of bearing balls 138 resting in a channel 139 formed in the upper end of the arm 134 around the lower end of the stem 133 while the upward movement of the hollow supporting sleeve 131 is prevented by a stop nut 140 or the like positioned in any suitable manner upon the reduced upper extremity of the stem 133. It will be understood that the lower end of the hollow supporting sleeve 131 rests upon the bearing balls 138 and that it is adapted to be rotated around the stem 133 by means of the gear 157 and screw 158. A drum support operated member 141 engaged with the teeth of the ratchet wheel 142 is carried by the lower portion of the hollow supporting member or sleeve 131. The portion of the member 141 engaged with the teeth of the ratchet wheel 142 extends at a right angle to the main portion of said member 141 and the opposite end of said member 141 is looped around an offset portion 143 of the coil spring 144, as shown at 145 adjacent the end of the coil spring having the hammer 146 formed thereon for engagement with the gong 147 to give an audible signal upon operation of the device. The body portion of the member 141 has an elongated longitudinal slot 148 through which a securing screw 149 extends, said member 149 being adjustably secured in the upper end of the plate 150 which is mounted upon the sleeve 151 secured upon the supporting pin 152 which is threaded in the upturned portion of the arm 134 and serves to support one of the protecting wires 153 which is held upon the supporting rod 152 by a nut 154 or other suitable means. The opposite end of the wire 153 is secured against the opposite side of the upstanding or upturned portion of the arm 134 by any suitable securing member, such as shown, 155. It will be understood that a second protecting wire, 155' is provided and positioned at right angles to the first mentioned protecting wire 153, a portion of the second wire 153 being shown in Fig. 20. It will also be understood that the plate 150 is rigid upon the sleeve 151, being clamped against the enlarged inner end of said sleeve 151 by the collar 156 mounted upon said sleeve 151 in any desired manner as clearly shown in Fig. 22.

It will be understood that a stationary gear or worm wheel 157, similar to the worm wheel 95 in the preferred form, is mounted rigidly upon the reduced upper end of the stem 133 and adapted to be engaged by the worm gear 158 similar to the worm gear 98 employed in the preferred form in order that the drum may be rotated in the same manner as in the preferred form.

The rotation of the support 131 causes the ratchet wheel 142 to actuate the member 141 and cause the hammer 146 to play upon the gong 147 to give an audible alarm.

It will be readily seen from the foregoing that as the ratchet wheel 142 rotates, it will engage the flange portion of the member 141 and cause movement of the said member 141 in one direction and as soon as this member is released the spring 144 will automatically return the member 141 to normal position, thereby causing the hammer 146 to strike the gong 147. This is repeated during the operation of the device, sounding the audible signal until the hollow support or sleeve 131 stops rotating.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

1. A device of the class described comprising a rotary fire extinguishing member formed to contain a fire extinguishing material, supporting means for said member, means for rotating said member, means for opening said member upon rotation of the same, means for causing the supporting means for said member to revolve upon rotation of said member, and an inflammable member for normally retaining the first mentioned member against rotation.

2. A device of the class described comprising a drum, means for supporting said drum, means for rotating said drum, means for opening said drum upon rotation of the latter, means for causing the drum supporting means to revolve upon rotation of said drum, an inflammable strip for retaining said drum against rotation, and means for completing a circuit to sound a signal upon destruction of the inflammable member.

3. A device of the class described comprising a drum, means for supporting said drum, means for rotating said drum, means for opening said drum upon rotation of the latter, means for causing the drum supporting means to revolve upon rotation of said drum, an inflammable strip for retaining said drum against rotation, means for completing a circuit to sound a signal upon destruction of the inflammable member, and means for locking the last mentioned means against operation.

4. A device of the class described including a support mounted for rotary movement on a vertical axis, a receptacle carried by the support and mounted for rotary movement on a horizontal axis, means for actuating the receptacle, mechanism for transmitting motion from the receptacle to the support for causing a rotary movement of the latter when the receptacle is actuated and inflammable means connected with the receptacle for holding the same against rotary movement.

5. A device of the class described including a support mounted for rotary movement on a vertical axis, a receptacle carried by the support and mounted for rotary movement on a horizontal axis, means for actuating the receptacle, mechanism for transmitting motion from the receptacle to the support for causing a rotary movement of the latter when the receptacle is actuated, a lever automatically movable in one direction, guiding means, a film arranged on the guiding means and connected with the receptacle and with the lever for holding the same against movement and an electric circuit having a signal and provided with a circuit closing device arranged in the path of the lever.

6. A device of the class described including a support mounted for rotary movement on a vertical axis, a receptacle mounted for rotary movement on the support on a horizontal axis and provided with a spout projecting from the periphery of the receptacle, said receptacle being adapted to contain fire extinguishing material, a closure for the spout, means for actuating the receptacle and for transmitting motion from the same to the support and means located in the path of the closure for opening the same when the receptacle is actuated.

In testimony whereof I affix my signature in presence of two witnesses.

THOMAS PERNEK, Sr.

Witnesses:
RALPH ORCARI,
GOE SALVATORE.